United States Patent Office 3,229,103
Patented Jan. 11, 1966

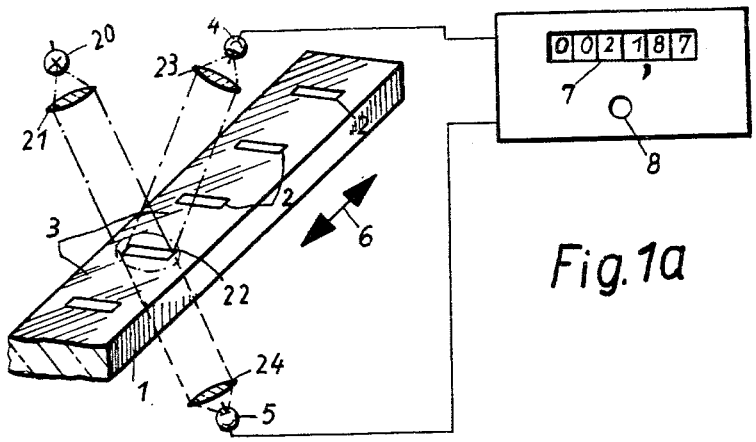
Fig. 1a
Fig. 1b
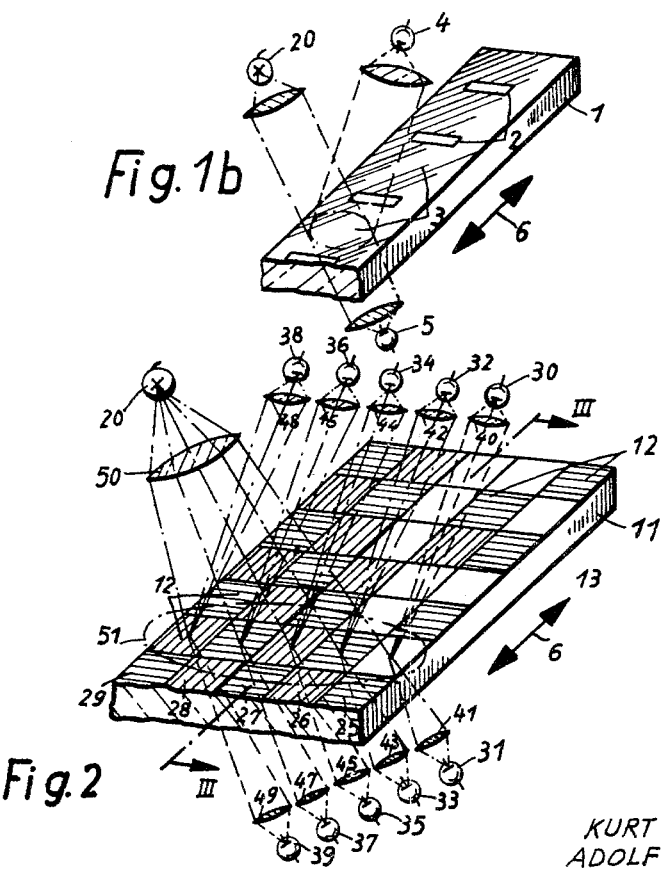
Fig. 2
INVENTORS
KURT RANTSCH
ADOLF WEYRAUCH

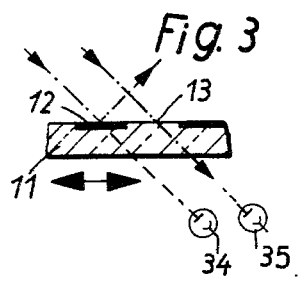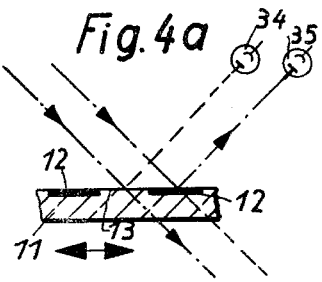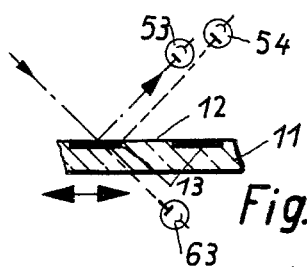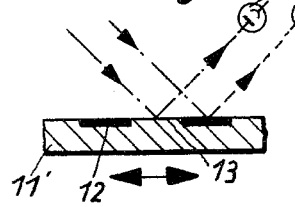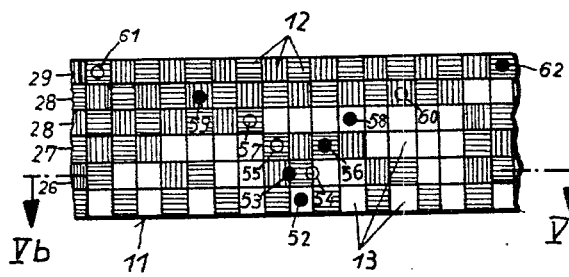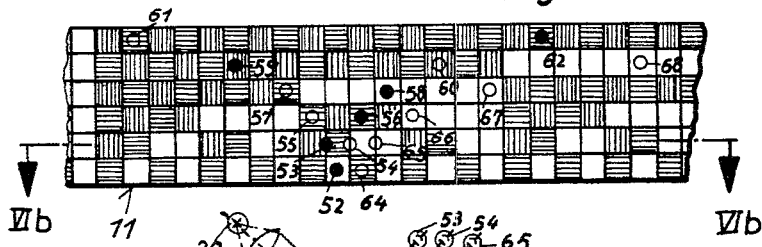

3,229,103
PHOTOELECTRIC POSITION INDICATING DEVICE
Kurt Räntsch and Adolf Weyrauch, Wetzlar (Lahn), Germany, assignors to M. Hensoldt & Söhne, Optische Werke Aktiengesellschaft, Wetzlar (Lahn), Germany
Filed Sept. 6, 1962, Ser. No. 221,914
Claims priority, application Germany, Sept. 9, 1961,
H 43,604
5 Claims. (Cl. 250—209)

The present invention relates to a photoelectric measuring arrangement, more particularly, to such a measuring arrangement wherein the effects of soiled or dirty scale markings on the scale and the failure of photoelectric cells to respond to such markings is eliminated.

It is recognized that one of the problems in photoelectric measuring arrangements occurs when the scale passing below the photoelectric sensing cell is dirty or soiled so that several of the scale markings or the spaces therebetween are not registered by the cell. This produces inaccurate measurement results since the total displacement of the scale is not properly indicated due to the failure of the photoelectric cell to register one or more of the scale markings.

Various proposals have been advanced in order to eliminate or avoid this disadvantage of photoelectric measuring arrangements. One solution has been to provide two measuring arrangements each of which operates according to different principles. For example, a photoelectric measuring arrangement and an arrangement operating on an electromagnetic principle are positioned to concurrently indicate the displacement of a scale. The two measuring arrangements accordingly mutually control each other and a signalling circuit is provided to give a signal when one or the other of the measuring arrangements fails to respond to the movement of the scale.

In binary coded measuring scales it has been proposed to arrange the scale annularly upon a disk wherein only one half of the disk is provided with the actual measuring scale and the other half of the disk is provided with a complementary scale. Two groups of photoelectric cells are then provided with one group being coordinated to the actual measuring scale and the other group to the complementary measuring scale. These two groups of photoelectric cells are then impinged by a complementary pattern of light. Thus, when the photoelectric cells coordinated to the actual measuring scale are impinged with light then no light is received by the photoelectric cells coordinated to the complementary measuring scale. The value of measurement is then indicated only during this complementary impingement of light. In the event one of the scales is dirty or soiled then two corresponding photoelectric cells in the groups of cells will be simultaneously impinged with darkness. Thus, the complementary pattern of light is interrupted to form a non-complementary pattern of light and a circuit is provided to give a signal in response to this non-complementary impingement of light upon the cells.

These proposals have the disadvantage in that they are very expensive, since the first-mentioned arrangement requires two sets of measuring instruments and the second arrangement requires two measuring scales.

It is therefore the principal object of the present invention to provide a novel and improved photoelectric measuring arrangement.

It is a further object of the present invention to provide a simpler and less expensive photoelectric measuring arrangement for effectively controlling a failure of a photoelectric cell to respond to the displacement of the measuring scale because of a dirty or smudged scale.

The present invention essentially comprises a translucent measuring scale wherein either the scale marks or the fields between the scale marks are translucent. In one embodiment of the invention the measuring scale is made of metal. The measuring scale is illuminated by either light transmitted through the scale or by incident light. A photoelectric cell is provided on one side of the measuring scale and another photoelectric cell is provided on the other side of the measuring scale so that one cell receives light transmitted through the scale and the other cell receives light reflected from the scale. These photoelectric cells are so connected in an electric circuit that a signal is emitted when a complementary pattern of light impinging on the photoelectric cells is interrupted and the pattern becomes non-complementary.

The present invention also provides for use of a binary coded measuring scale with the photoelectric cells being arranged in pairs in both the reflected and the transmitted light. When the cells are arranged in the reflected light so that one cell is coordinated to a reflecting portion of the measuring scale and the other cell coordinated to an adjacent light transmitting area of the scale and both are wired to a circuit to emit a signal during a non-complementary impingement of light thereon, such a non-complementary impingement of light will occur only when the reflecting area of the measuring scale is dirty or soiled. Any soiling on the light transmitting portions of the measuring scale will not produce incorrect measuring results. When the photoelectric cells are arranged in the transmitted light with one cell being coordinated to a light transmitting area of the measuring scale and the other coordinated to an adjacent opaque portion of the field, then only a soiling of the light transmitting field will produce a non-complementary impingement of light. Any soiling of the opaque field will not produce incorrect measuring results.

The present invention further provides for positioning three or more photoelectric cells in a V-formation on one side of the measuring scale so that the cells may be used both to indicate an absolute value on the scale and to emit a signal when non-complementary patterns of light impinge thereon.

Other objects and advantages of the present invention will be apparent from the accompanying description when taken in conjunction with the following drawings, wherein;

FIGURE 1a is a perspective view of a portion of a measuring scale and schematicall yshowing the arrangement of photoelectric cells with respect thereto;

FIGURE 1b is a view of FIGURE 1a with the measuring scale shifted relative to the position shown in FIGURE 1a;

FIGURE 2 is a perspective view of a binary coded scale schematically showing the arrangement of photoelectric cells with respect thereto;

FIGURE 3 is a longitudinal sectional view of FIGURE 2 along the line III—III in FIGURE 2 with a modified arrangement of the photoelectric cells;

FIGURE 4a is a longitudinal sectional view of FIGURE 2 along the line III—III in FIGURE 2 with a differently modified arrangement of the photoelectric cells;

FIGURE 4b is a modified embodiment of the invention similar to FIGURE 4a;

FIGURE 5a is a plan view of FIGURE 2 with a modified arrangement of photoelectric cells;

FIGURE 5b is a section along the line Vb—Vb of FIGURE 5a;

FIGURE 6a is a plan view of FIGURE 2 with a modified arrangement of the photoelectric cells; and FIGURE 6b is a section along the line VIb—VIb of FIGURE 6a.

With reference to the drawings, wherein like reference symbols indicate the same parts throughout the various views, the specific embodiment and several modifications of this invention will next be described in detail.

As may be seen in FIGURE 1a, there is illustrated a translucent measuring scale body 1 having scale marks 2 thereon to define a graduated measuring scale. The scale marks 2 are made of a light reflecting material. The areas of the scale body between the scale marks are designated as fields 3 and are light transmitting. Photoelectric cells 4 and 5 are positioned on opposing sides of the measuring scale 1. A light source 20 is positioned above the measuring scale as seen in FIGURE 1a, so that photoelectric cell 4 receives light reflected from the surface of a scale mark 2 and photoelectric cell 5 receives darkness. The scale 1 is longitudinally displaceable in the directions indicated by the double-headed arrow 6.

Between the light source 20 and the scale 1 a lens 21 is provided to illuminate only a portion 22 on the surface of the scale 1. Lenses 23 and 24 serve the purpose of forming an image of the portion 22 on the photoelectric cells 4 and 5.

When light impinges onto one of the scale marks 2, as shown in the FIGURE 1a, then light is received only by photoelectric cell 4. When the light impinges onto one of the light transmitting fields 3, as shown on the FIGURE 1b, then light is received only by the photoelectric cell 5. Thus, when this measuring arrangement is operating normally, a complementary pattern of light is impinged upon the photoelectric cells 4 and 5, since one cell or the other is impinged with light and this impingement of light is done sequentially.

The longitudinal displacement of the measuring scale is indicated by the number of scale marks 2 which are registered by the photoelectric cells 4 and 5. The registration of these scale marks produces electrical pulses which are then indicated in numeral read-out tube 7 connected in circuit with the photoelectric cells 4 and 5.

The photoelectric cells 4 and 5 are also connected in a signalling circuit wherein a signal light 8 is illuminated when the complementary pattern of light normally impinging upon the photoelectric cells 4 and 5 is interrupted. This pattern of light would be interrupted when one of the scale marks 2 or one of the light transmitting fields 3 is smudged or covered with dirt so that no light would be received by the two photoelectric cells.

In FIGURE 2 there is shown a modification of the present invention which comprises a binary coded measuring scale having a scale body 11 upon which are spaced light reflecting fields 12 between which are alternatingly arranged light transmitting fields 13. The fields 12 and 13 form longitudinally extending sections 24–29. For each of said sections two photocells 30, 31 and 32, 33 and 34, 35 and 36, 37 and 38, 39 are provided which act as described in connection with FIGURES 1a and 1b.

Between each photocell and the scale 11 there are provided lenses 40–49 forming an image of light reflecting field 12 or light transmitting field 13 on the respective photocell. The light source 20 illuminates through its associated lens 50 the portion 51 of the measuring scale 11. With this binary coding of the measuring scale the absolute value of the position of the measuring scale with respect to the photoelectric sensing cells is continuously indicated in numeral read-out tubes which are not shown in FIGURE 2. The photoelectric cells of each pair 30, 31 and 32, 33 and 34, 35 and 36, 37 and 38, 39 are connected in an electric circuit so as to actuate a signalling system not shown in FIGURE 2 when a non-complementary pattern of light impinges upon the photoelectric cells.

In a modification of FIGURE 3 a similar binary coded measuring scale 11 is employed, but both of the photoelectric cells 34 and 35 are positioned on the other side of the measuring scale with respect to the light source, so as to receive light transmitted through the translucent scale body. The same arrangement may exist for the photocells of every other pair of cells. The photoelectric cells 34 and 35 are coordinated with the adjacent fields on the scale body, i.e. the light reflecting and opaque field 12 and the light transmitting fields 13. As the scale body is displaced, one or the other of the photoelectric cells 34 and 35 is impinged with light in what may be described as a complementary pattern of light. The cells 34 and 35 are connected in an electric circuit so as to actuate a signalling system when a non-complementary pattern of light impinges on the cells due to a soiling or smudging of one of the fields 12 or 13.

In a modification of FIGURE 4a the photoelectric cells 34 and 35 are arranged on the same side of the measuring scale 11 with respect to the light source so that the photoelectric cells receive light reflected from the scale body.

In a similar manner as described for FIGURE 3 the photoelectric cells are connected into an electric circuit so as to actuate a suitable signal device when a non-complementary pattern of light impinges upon these cells.

In FIGURE 4b the translucent scale body according to FIGURE 4a is replaced by an opaque scale body 11' preferably made of metal. The portions between the scale marks 13 are light reflecting, and the scale marks 12 are light absorbing.

In the modification of FIGURES 5a and 5b, the photoelectric cells are arranged in a V-formation 52–62 on one side of the measuring scale in such a manner that the cells 53–62 are longitudinally spaced over the longitudinal sections 26–29 of the measuring scale. The cells 53, 54, as well as the cells 55, 56, as well as the cells 57, 58, as well as the cells 59, 60, as well as the cells 61, 62 are spaced one-half the length of an area on the respective longitudinal sections.

The cell 52 receives light from a field 13 and acts therefore onto the cells 53 and 54 so that the cell 53 serves for measuring on the section 26. The cell 53 is positioned above a field 12 and does not receive light from this field. Therefore, it controls the cell 56 coordinated to the section 27. The cell 56 is positioned above a field 12 and therefore does not receive light. Consequently, it controls the cell 58 of section 28. The photocell 58 is positioned above a field 13 and therefore receives light from that field. It controls the photoelectric cell 59 of section 28, and so on. The photoelectric cells which are in action are shown as dark dots.

The photocells 52, 53, 55, 57, 59, 61 are coordinated with another photocell each, which is impinged with light in a complementary pattern to the named photocells.

As seen in FIGURE 5b the photocell 53 is coordinated with photocell 63. When photocell 53 gets light, photocell 63 gets darkness.

In the modification of FIGURES 6a and 6b, photoelectric cells 52–62 are arranged in V-formation. The photoelectric cells 64–68 are positioned on the same side of the measuring scale 11 as the light source so that the cells receive reflected light from the measuring scale. The cells 64–68 have a distance from the cells 52, 53, 55, 57, 59, 61 in each section corresponding to the length of a field in this section. Thus, these cells receive light in a complementary pattern and serve for control purposes.

It will be understood that this invention is susceptible to further modification and, accordingly, it is desired to comprehend such modifications within this invention as may fall within the scope of the appended claims.

What we claim is:

1. In a photoelectric position indicating device, a translucent longitudinally displaceable scale body provided with opaque light-reflecting scale marks defining a graduated scale and translucent fields between said scale marks, means forming a light beam for illuminating said scale body from one side thereof, a first photoelectric cell on one side of said scale body adapted to be energized by light from said light beam passing through said translucent fields and a second photoelectric cell on the other side of said scale body adapted to be energized by light from said light beam which is reflected by one of said scale marks when the latter is illuminated by said light beam and said light beam is blocked by said scale mark from passing through said scale body to energize said first photoelectric cell, whereby upon displacement of said scale body the opaque light-reflecting scale mark is moved out of the path of said light beam so that the latter passes through one of said translucent fields and energizes said first photoelectric cell, while said second photoelectric cell becomes deenergized, a read-out tube arranged in a circuit with said two alternately energized photoelectric cells, and means forming a signalling circuit connecting said photoelectric cells for producing a visible signal when a predetermined complementary pattern of light impulses energizing said photoelectric cells is interrupted by impurities on said scale body and becomes non-complementary.

2. In a photoelectric position indicating device, an opaque longitudinally displaceable scale body provided with light-absorbing scale marks defining a graduated scale and light-reflecting fields between said scale marks, means forming a light beam for illuminating said scale body from one side thereof, a first photoelectric cell on one side of said scale body adapted to be energized by light from said light beam reflected by said scale body, and a second photoelectric cell disposed on the same side of said scale body adapted to be energized by light from said light beam reflected by said scale body, said first and second photoelectric cells being so disposed that while one is illuminated by the light being reflected by the light reflecting field the other is disposed in the shadow of a light absorbing scale mark, a readout tube arranged in a circuit with said two alternately energized photoelectric cells, and means forming a signalling circuit connecting said photoelectric cells for producing a visible signal when a predetermined complementary pattern of light impulses energizing said photoelectric cells is interrupted by impurities on said scale body and becomes non-complementary.

3. In a photoelectric position indicating device, a longitudinally displaceable translucent scale body having a plurality of longitudinally extending sections arranged in parallel, said sections having scale marks thus defining a binary coded scale, said scale marks being light reflecting, a single light source illuminating said scale body, an arrangement of photoelectric cells on one side of said scale body with two photoelectric cells coordinated to one longitudinally extending section and one photoelectric cell coordinated to another longitudinally extending section, said photoelectric cell when viewing said scale body in plan view being arranged in the form of a V over said plurality of longitudinal sections, an electric counting circuit connecting said photoelectric cells for indicating the displacement of said scale body according to one of said two photoelectric cells as controlled by said one photoelectric cell, further photoelectric cells on the other side of said scale body, each of said cells being provided for each one of said extending sections, said first named and second named photoelectric cells being so disposed that when one is illuminated by the light being reflected by the light reflecting scale marks the other is disposed in the shadow of said scale marks, and an electric circuit connecting said further photoelectric cells and the first of said two photoelectric cells in the direction of displacement of said scale body so that a signal is given when a predetermined complementary pattern of light from said light source impinging on said photoelectric cells is interrupted so as to become non-complementary.

4. In a photoelectric position indicating device, a longitudinally displaceable translucent scale body having a plurality of longitudinally extending sections arranged in parallel, said sections having scale marks thus defining a binary coded scale, said scale marks being light-reflecting, a single light source illuminating said scale body, an arrangement of photoelectric cells on one side of said scale body with two photoelectric cells coordinated to one longitudinally extending section and one photoelectric cell coordinated to another longitudinally extending section, said photoelectric cell when viewing said scale body in plan view being arranged in the form of a V over said plurality of longitudinal sections, an electric counting circuit connecting said photoelectric cells for indicating the displacement of said scale body according to one of said two photoelectric cells as controlled by said one photoelectric cell, further photoelectric cells on the same side of said scale body, each of said cells being provided for each one of said extending sections, said first named and second named photo-electric cells being so disposed that when one is illuminated by the light reflected by a light reflecting field the other is disposed in the shadow of a light reflecting scale mark, and an electric circuit connecting said further photoelectric cells and the first of said two photoelectric cells in the direction of displacement of said scale body so that a signal is given when a predetermined complementary pattern of light from said light source impinging on said photoelectric cells is interrupted so as to become non-complementary.

5. In a photoelectric position indicating device, a longitudinally displaceable translucent scale body having a plurality of longitudinally extending sections arranged in parallel, said sections having scale marks forming fields of equal length thus defining a binary coded scale, said scale marks being light-reflecting, a single light source illuminating said scale body, an arrangement of photoelectric cells on one side of said scale body with two photoelectric cells coordinated to one longitudinally extending section and a third photoelectric cell coordinated to another longitudinally extending section, said photoelectric cell when viewing said scale body in plan view being arranged in the form of a V over said plurality of longitudinal sections, said two photoelectric cells having a distance from each other in each longitudinally extending section corresponding to one half of the field length, and one of said two photocells and said third photocell having a distance from each other corresponding to the length of one field, an electric counting circuit connecting said photoelectric cells for indicating the displacement of said scale body according to one of said two photoelectric cells as controlled by said one photoelectric cell, further photoelectric cells on the other side of said scale body, each of said cells being provided for each one of said extending sections, the arrangement of photo-electric cells of one side of said scale body and the photo-electric cells on the other side of said scale body being so disposed that when the photo-electric cells on one side of said scale body are illuminated by the light being reflected by a light reflecting field the other is disposed in the shadow of a light reflecting scale mark, and an electric circuit connecting said further photoelectric cells and the first of said two photoelectric cells in the direction of displacement of said scale body so that a signal is given when a predetermined complementary pattern of light impinging on said photoelectric cells is interrupted so as to become non-complementary.

References Cited by the Examiner

UNITED STATES PATENTS

| | | | |
|---|---|---|---|
| 2,632,855 | 3/1953 | Bendz | 250—219 |
| 2,845,710 | 8/1958 | Claret et al. | |
| 2,948,890 | 8/1960 | Barth et al. | 88—14 |

FOREIGN PATENTS 833,329    4/1950    Great Britain.

RALPH G. NILSON, *Primary Examiner.*

WALTER STOLWEIN, *Examiner.*